United States Patent [19]
Gray et al.

[11] Patent Number: 5,417,459
[45] Date of Patent: May 23, 1995

[54] SUBSEA UMBILICAL CONNECTOR

[75] Inventors: David A. Gray, Cypress; William C. Parks, Katy, both of Tex.

[73] Assignee: Sonsub, Inc., Houston, Tex.

[21] Appl. No.: 201,174

[22] Filed: Feb. 24, 1994

[51] Int. Cl.$^6$ .............................................. F16L 35/00
[52] U.S. Cl. ...................................... 285/26; 285/119; 285/137.1
[58] Field of Search ...................... 285/123, 191, 137.1, 285/137.2, 26, 29, 119

[56] References Cited

U.S. PATENT DOCUMENTS

| | | | |
|---|---|---|---|
| 3,229,656 | 1/1966 | Bodey | 285/137.1 X |
| 4,302,034 | 11/1981 | Weirich et al. | 285/137.1 X |
| 4,611,831 | 9/1986 | Truchet | 285/137.1 X |
| 5,333,691 | 8/1994 | Dean et al. | 285/137.1 X |

FOREIGN PATENT DOCUMENTS 2439216  2/1975  Germany ........................... 285/137.1

Primary Examiner—Dave W. Arola
Attorney, Agent, or Firm—Pravel, Hewitt, Kimball & Krieger

[57] ABSTRACT

An improved umbilical connector for preferable use in a subsea application. The apparatus includes a female portion and a male portion having connections located within, and a threadable fastener on the male and female halves intended to threadably engage thereby advancing and locking the male half within the female half of the present invention.

5 Claims, 3 Drawing Sheets

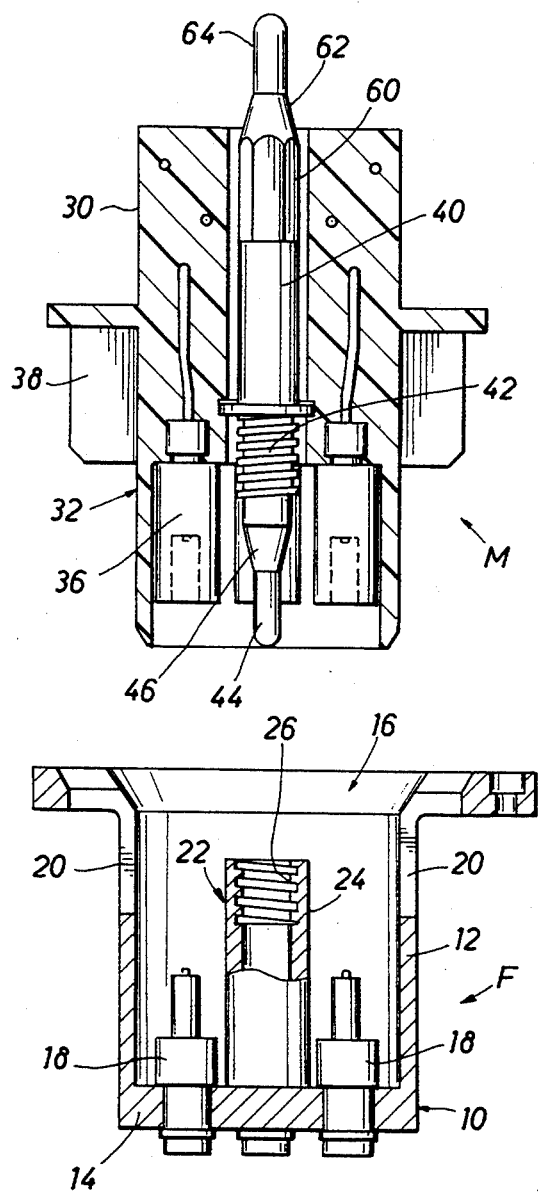
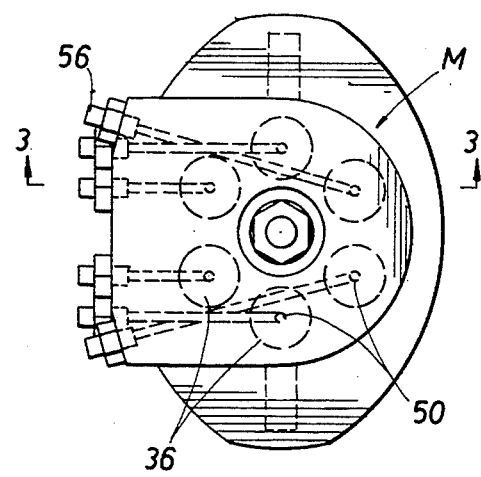
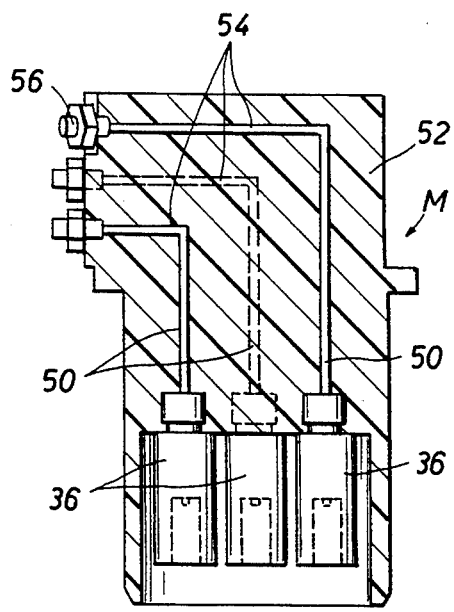
FIG. 1
FIG. 3

FIG. 4
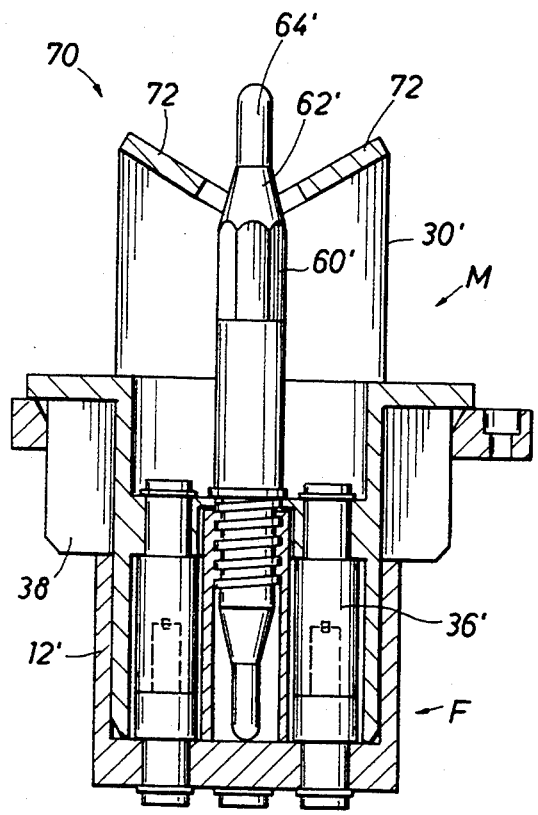
FIG. 5
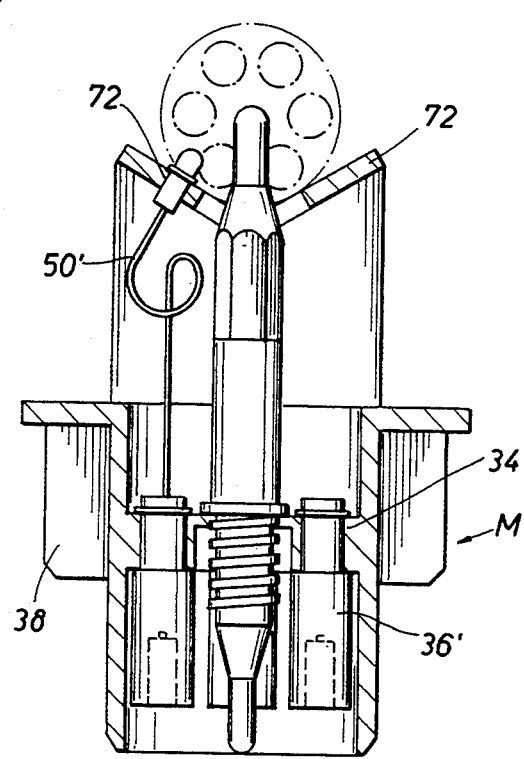
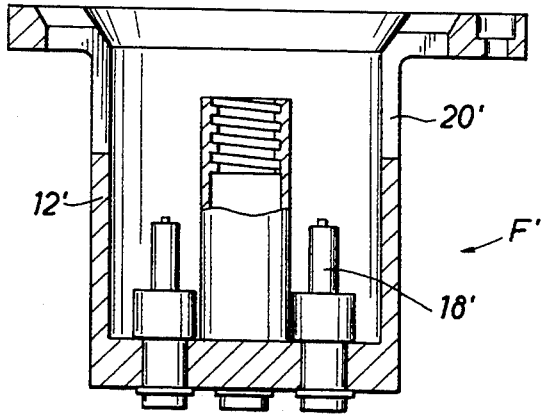

SUBSEA UMBILICAL CONNECTOR

BACKGROUND OF THE INVENTION

1. Field of the Invention

This invention relates to an improved connector. More specifically, this invention relates to an improved underwater umbilical connector adapted for final engagement using a remotely operated vehicle.

2. Description of the Prior Art

Umbilical connectors, particularly those adapted for connection by a remotely operated vehicle (ROV) can be difficult to engage in a subsea environment, particularly when a series of connectors must be joined. The forces required to engage the connectors and seal them in a water-tight manner, permitting the connection to be made in a reliable manner, can require a substantial amount of axial force.

Consequently, there is a need for a reliable subsea umbilical connector which can be engaged by an ROV with a minimal amount of force. This is particularly true when a series of subsea connections must be made simultaneously.

SUMMARY OF THE INVENTION

Briefly, the invention relates to an improved subsea umbilical connector which includes a female half and a male half. Mounted within each half are a series of standard hydraulic or electrical connections which are in turn connected to a series of hydraulic or electrical lines extending to various functions for subsea applications. The invention includes a remotely engaged fastener, preferably threaded, which enables a substantial amount of axial load to be introduced into the male and female halves of the connector permitting a solid and tight connection with a minimal amount of force required by the ROV.

The invention includes a positioning system to preliminarily align the male half and the female half during the initial engagement process and followed by the engagement of the male and female portions of the fastener. Preferably, the male portion of the fastener is rotated engaging the female portion and advancing the male half of the connector into the female half, further engaging the plurality of connectors and providing for a solid and water-tight engagement.

Examples of the more important features of this invention have been summarized broadly in order that the detailed description will be better understood. There are, of course, additional features of the invention which will be described hereafter and which also form the subject of the claims appended hereto.

BRIEF DESCRIPTION OF THE DRAWINGS

In order to more fully understand the drawings used in the detailed description of the present invention, a brief description of each drawing is provided.

FIG. 1 is a cross-sectional elevation view of the present invention illustrating the male and female halves in a separated configuration.

FIG. 2 is a top view of the present invention.

FIG. 3 is a partial cross-sectional view taken along line 3—3 of FIG. 2 illustrating the male half of the present invention.

FIG. 4 is a cross-sectional elevation view of an alternate embodiment of the present invention in a connected mode.

FIG. 5 is a cross-sectional elevation of the alternate embodiment of the present invention in a separated mode.

DETAILED DESCRIPTION OF PREFERRED EMBODIMENT

Figure 6A:
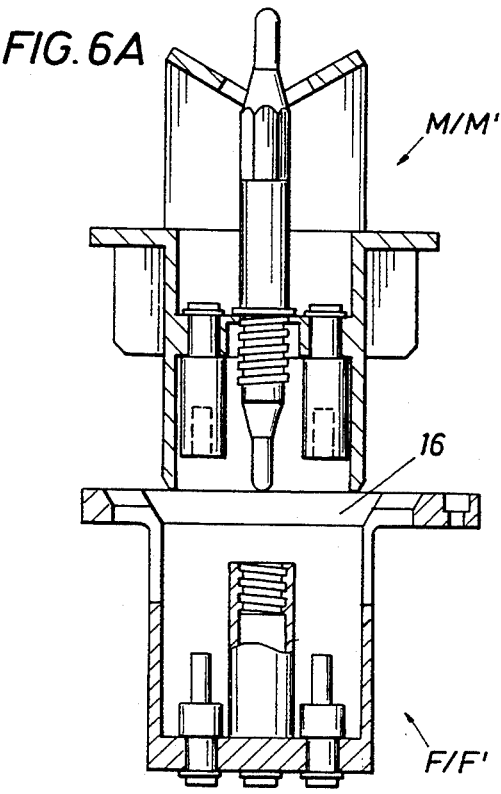
FIGS. 6 A-D are sequential views illustrating the engagement of the male and female halves of the present invention.

Referring to FIGS. 1-3, the preferred embodiment of the present invention comprises a male half M and a female half F. The female half F comprises a housing or bucket 10 having a side wall 12 and a base 14. The top portion 16 of the housing 10 is open.

Mounted on the base 14 are a plurality of connectors 18. Preferably, these connectors are hydraulic, but they may be of other types such as electrical. As shown in FIG. 1, the connection 18 includes only the male portion. Such hydraulic connectors, for example, may be off-the-shelf type connectors such as those manufactured by National Coupling (Male Model TO-4-A-16; Female Model TO-4-B23). The housing 10 includes two slots 20 near the top portion 16. Mounted within housing 10 is a female fastener 22. Fastener 22 includes a housing 24 which is preferably attached to the base 14. The interior of the housing 24 includes a threaded connection 26. Preferably, the threaded connection is comprised of General Purpose Acme Single-Start Screw threads.

Referring still to FIG. 1, and for illustrative purposes only, six National coupling hydraulic connectors style (Male Model TO-4-A-16; Female Model TO-4-B-23) are shown having a nominal diameter of 1½ inches and arranged on a 3¾ inch bolt circle; the inside diameter of the housing 10 would be a nominal six inches.

Still referring to FIGS. 1-3, the male portion M also includes a housing 30 having a side wall 32 and a base 34 (see FIG. 5). The female receptacles of connectors 36 are located within housing 30 and are mounted to base 34. Again, preferably the connectors 36 are hydraulic, but they may be of other types, such as electrical.

The male half M includes plates 38 which are attached to side wall 32. A male portion of a fastener 40 is attached and is also supported by base 34 (FIG. 5) within the center portion of the housing. The male portion 40 also includes a threaded section 42 comprising General Purpose Acme Single-Start Screw threads which are intended to engage with threads 26 of the female portion of fastener 22. The male portion 40 also includes a reduced diameter section 44 which is attached to the main portion of male probe 40 through a transition diameter section 46. In this manner, as discussed below, reduced diameter portion 44 assists in the positioning and transition of male probe 40 into female receptacle 22.

Referring now to FIG. 3, female receptacle 36 is in fluid communication with line 50 which transfers through the upper housing portion 52 of the male half M. Preferably, lines 50 includes a 90° turn 54 as they transition to a nipple connection 56. A 90° transition is preferred to permit the male probe 40 to extend to the top of the male half M without interference with the lines 50.

Referring back to FIG. 1, the top portion of the male probe 40 includes a multi-sided portion 60 which continues through a transition diameter section 62 to a narrower diameter 64. In this manner, an ROV probe having a multi-sided wrench adapted to engage portion 60 of male probe 40 can target for narrower diameter 64 and transition through section 62 onto multi-sided portion 60. As will be discussed below, the ROV will then engage the multi-sided portion 60 and torque or rotate male portion 40 of the fastener to threadably engage via threads 42 and 26 thereby engaging the male half M with the female half F.

Referring to FIGS. 4 and 5, an alternate embodiment of the present invention is shown which includes a V-shaped portion 70 near the top portion of the male half M. The V-shaped portion 70 includes V plates 72 which are oriented at an angle of approximately 90° with a side wall 30' of male half M'. Except as otherwise noted herein, the structure of the alternate embodiment would be identical to that of the preferred embodiment.

Referring to FIG. 5, illustrated in schematic form are lines 50' which extend from the top portion of base 34. One line would extend from each male probe 36'. As shown, the six lines may be bundled near the top portion of the V plate and will be selected to accommodate a 90° bend in order to move the lines away from the top of the male half to enable the ROV to engage portion 60', 62' and 64' of the male portion 40' of the fastener. The plate 72 serves to support the bundling of the lines 50' extending from the top portion of the male half.

Figure 6B:
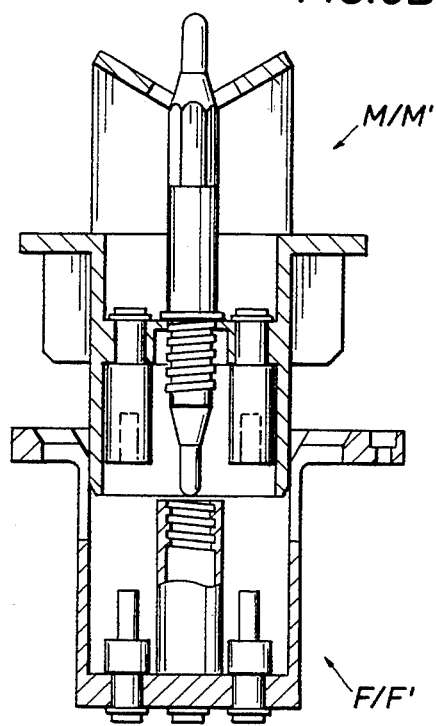
Figure 6C:
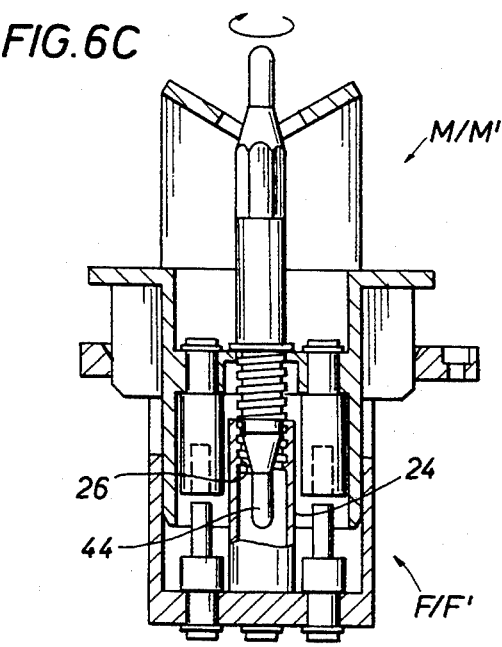
Figure 6D:
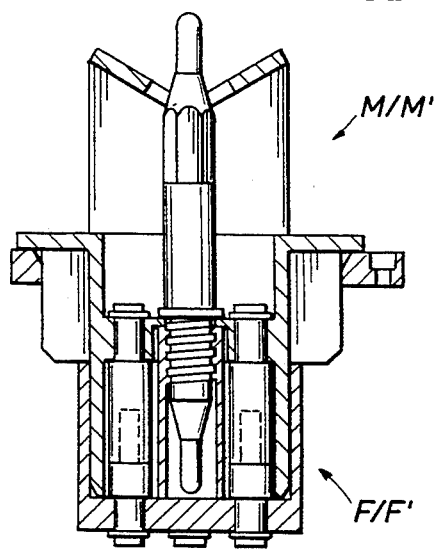

Referring now to FIGS. 6A through 6D, the operation of the present invention will be described. FIGS. 6A and 6B illustrate the gradual encroachment of the male half M/M' of the present invention towards the female half F/F'. As shown in FIG. 6B, the tip of the male half is proximate to the top portion 16 of the female half. In FIG. 6C the reduced diameter portion 44 has entered the female housing and is about to enter the threaded portion 26 of the housing 24 of the female fastener. Once the smaller diameter portion 44 has entered the female fastener housing 24, the transition section 46 provides for a gradual increase and a more precise alignment. Generally, it is at this portion of the insertion process that the lower portion of the full diameter section 40 immediately below the threads 42 enters the housing 24 of the female fastener and it becomes difficult to further insert the male half. Thus, at this point, the male half is rotated until the plates 38 are aligned with slots 20. Through this prearranged alignment, the proper connections are insured between the male half and the female half of the present invention. Once plates 38 are aligned within slots 20, further insertion may continue. FIG. 6D illustrates the proper alignment of the plates within the slots following insertion.

The selection of the distance of the threaded connection portions along male probe 40 and within female housing 24 are selected to begin approximately ¼ inch before the initial contact of the male probe 18 with female receptacle 36. This criteria is preferred since connectors 18 such as those referenced herein include a spring loaded poppet valve within both the end interface of the male and female halves of the connectors. To overcome the spring forces of the poppet valves, particularly when a multiplicity of connectors are used (and in particular if the subsea application calls for a bank of improved umbilical connectors as those described herein), substantial axial force must be introduced to overcome spring forces of all the connectors and insure a full engagement of the male half M within the female half F the present invention. To provide the necessary force, particularly in an ROV application where limited axial force is available, the present invention provides for the use of rotational movement with a minimal amount of frictional force on the threaded portions 24 and 42 to create a substantial axial load to mate halves M and F. As the threaded connections engage, the ROV continues rotating male portion 40 through the multi-sided connection 60 which is selected to match a multi-sided wrench connection on the ROV. In this manner, minimal torque is required for an ROV to move male probe 40 through Acme threaded connections 24 and 42 and fully engage the male half M within the female half F.

The present invention has been described in terms of particular embodiments. Obviously, modifications and alterations to these embodiments will be apparent to those skilled in the art in view of this disclosure. It is, therefore, intended that all such equivalent modifications and variations fall within the spirit and scope of the present invention as claimed.

What is claimed is:

1. An improved umbilical connector comprising:
   a female half having:
      a first housing including a side wall and a first base,
      a plurality of male probes mounted on said first base,
      a female portion of a fastener mounted on said first housing, and
      a first positioning means having a slot within said side wall of said first housing; and
   a male half having:
      a second housing having a side wall and a second base,
      a plurality of female receptacles mounted on said second base,
      a male portion of a fastener mounted on said second housing, and
      a second positioning means having a plate attached to said side wall of said second housing;
   wherein said first housing is adapted to fit within said second housing permitting said first positioning means to engage said second positioning means thereby aligning said female half relative to said male half, and
   wherein further insertion of said first housing within said second housing enables the engagement of said male portion of said fastener with said female portion of said fastener permitting the further engagement of said male half with said female half and the connection of said receptacles within said probes.

2. An improved umbilical connector according to claim 1 wherein said female portion and said male portion of said fastener include engagable threaded connections so that rotational movement of said male portion relative to said female portion permits final engagement of said male half with said female half.

3. An improved umbilical connector according to claim 2 wherein said male portion of said fastener includes a multi-sided portion at the opposite end from said engagable threaded connection portion.

4. An improved umbilical connector according to claim 1 wherein said male probes and said female receptacles are hydraulic connections.

5. An improved umbilical connector according to claim 1 wherein said male probe and said female receptacle are electrical connections.

* * * * *